US008714291B2

(12) United States Patent
Riach

(10) Patent No.: US 8,714,291 B2
(45) Date of Patent: May 6, 2014

(54) CLEANING MACHINE

(75) Inventor: Alan Riach, Bathgate (GB)

(73) Assignee: Tennant N.V., Uden (NL)

(*) Notice: Subject to any disclaimer, the term of this patent is extended or adjusted under 35 U.S.C. 154(b) by 347 days.

(21) Appl. No.: 12/999,736

(22) PCT Filed: Jun. 18, 2009

(86) PCT No.: PCT/EP2009/057610
§ 371 (c)(1),
(2), (4) Date: Dec. 17, 2010

(87) PCT Pub. No.: WO2009/153315
PCT Pub. Date: Dec. 23, 2009

(65) Prior Publication Data
US 2011/0155488 A1 Jun. 30, 2011

(30) Foreign Application Priority Data

Jun. 19, 2008 (GB) .................................. 0811321.9

(51) Int. Cl.
B60R 16/04 (2006.01)
(52) U.S. Cl.
CPC .................................. B60R 16/04 (2013.01)
USPC ....................................... 180/68.5; 180/65.1
(58) Field of Classification Search
CPC ....................................................... B60R 16/04
USPC .............................................. 180/65.1, 68.5
See application file for complete search history.

(56) References Cited

U.S. PATENT DOCUMENTS

| 3,797,600 | A | * | 3/1974 | Miner ........................... 180/298 |
| 3,930,552 | A | * | 1/1976 | Kunkle et al. ................ 180/68.5 |
| 4,216,839 | A | * | 8/1980 | Gould et al. ................. 180/65.1 |
| 4,433,744 | A | * | 2/1984 | Muhlbacher ................. 180/65.7 |
| 4,609,313 | A | * | 9/1986 | Oshino et al. .................... 410/67 |
| 4,779,692 | A | * | 10/1988 | Hagarty et al. .............. 180/68.5 |
| 4,884,313 | A | * | 12/1989 | Zoni ............................ 15/340.3 |
| 5,585,205 | A | * | 12/1996 | Kohchi ............................ 429/99 |
| 5,639,571 | A | * | 6/1997 | Waters et al. .................... 429/71 |
| 6,094,927 | A | * | 8/2000 | Anazawa et al. ............... 62/239 |
| 6,220,380 | B1 | * | 4/2001 | Mita et al. .................... 180/65.1 |
| 6,357,070 | B1 | * | 3/2002 | Venard et al. ................. 15/50.1 |
| 6,631,775 | B1 | * | 10/2003 | Chaney ........................ 180/68.5 |
| 6,938,553 | B2 | * | 9/2005 | Tamaki et al. ................... 104/34 |

(Continued)

FOREIGN PATENT DOCUMENTS

CH 662788 10/1987
DE 3047676 7/1982

(Continued)

OTHER PUBLICATIONS

English-language abstract DE3135490 (Muehlbacher).

(Continued)

Primary Examiner — Hau Phan
Assistant Examiner — Jacob Meyer
(74) Attorney, Agent, or Firm — Fredrikson & Byron, P.A.

(57) ABSTRACT

A cleaning machine having two front wheels and two rear wheels supporting a chassis, the chassis having a central spine, the cleaning machine including a first electrical cell for propelling the cleaning machine, said first electrical cell being positioned between one of the front wheels and one of the rear wheels and outboard of the central spine.

19 Claims, 13 Drawing Sheets

(56) References Cited

U.S. PATENT DOCUMENTS

Figure 1:
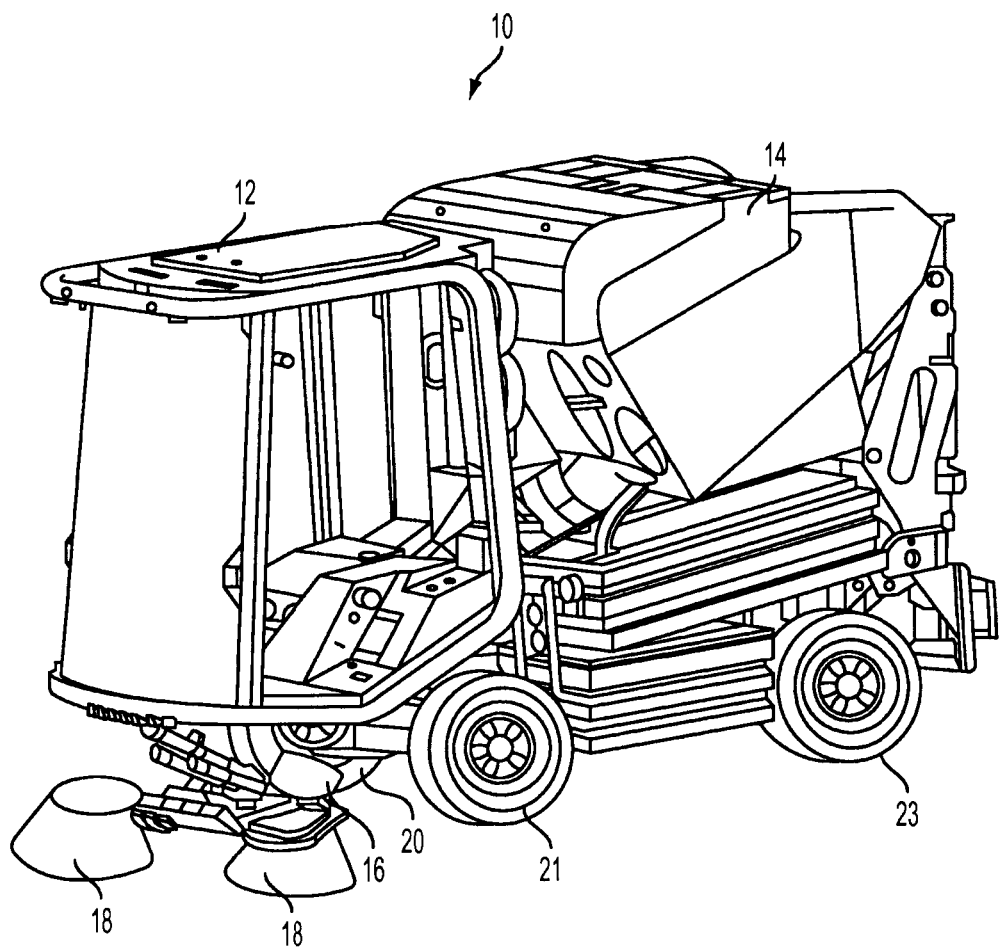

| | | | |
|---|---|---|---|
| 6,988,575 B2* | 1/2006 | Takedomi et al. | 180/68.5 |
| 7,004,274 B2* | 2/2006 | Shibasawa et al. | 180/68.5 |
| 7,021,412 B2* | 4/2006 | Koike et al. | 180/68.5 |
| 7,556,110 B2* | 7/2009 | Yamamoto et al. | 180/65.31 |
| 7,678,494 B2* | 3/2010 | Tsuchiya | 429/120 |
| 7,712,563 B2* | 5/2010 | Niebuhr | 180/68.5 |
| 7,838,142 B2* | 11/2010 | Scheucher | 429/99 |
| 8,016,063 B2* | 9/2011 | Tsuchiya | 180/68.5 |
| 8,025,118 B2* | 9/2011 | Scheucher | 180/68.5 |
| 8,037,960 B2* | 10/2011 | Kiya | 180/68.5 |
| 8,051,934 B2* | 11/2011 | Kiya et al. | 180/68.5 |
| 8,146,694 B2* | 4/2012 | Hamidi | 180/68.5 |
| 8,376,076 B2* | 2/2013 | Kataoka et al. | 180/68.5 |
| 2002/0157886 A1* | 10/2002 | Iwase | 180/68.5 |
| 2003/0098191 A1* | 5/2003 | Takedomi et al. | 180/68.5 |
| 2003/0186115 A1* | 10/2003 | Shibasawa et al. | 429/100 |
| 2005/0217910 A1* | 10/2005 | Yonehana et al. | 180/68.5 |
| 2008/0006459 A1* | 1/2008 | Niebuhr | 180/68.5 |

FOREIGN PATENT DOCUMENTS

| | | | |
|---|---|---|---|
| DE | 3135490 | 7/1982 | |
| DE | 4331900 A1 * | 3/1994 | B60R 21/00 |
| EP | 1164074 | 12/2001 | |
| GB | 1225858 | 3/1971 | |
| GB | 2097346 | 11/1982 | |
| WO | 2004103801 | 12/2004 | |

OTHER PUBLICATIONS

English-language abstract EP1164074 (Mako Werke GmBH).
English-language abstract CH662788 (Berger).
International Search Report, dated Oct. 14, 2009 for corresponding PCT Application No. PCT/EP09/57610 (4 pages).

* cited by examiner

CLEANING MACHINE

CROSS-REFERENCE TO RELATED APPLICATIONS

The present application claims priority to International Application No. PCT/EP2009/057610 filed Jun. 18, 2009, which in turn claims priority to UK Application No. 0811321.9 filed Jun. 19, 2008, the teachings of which are incorporated herein by reference.

The present invention relates to cleaning machines, in particular road cleaning machines, or road sweeping machines. The term "road cleaning" and "road sweeping" are used broadly to include cleaning and sweeping of other areas such as pedestrian precincts, footpaths, car parks etc. Road cleaning machines are machines for lifting dirt off the road and into a hopper. Road sweeping machines are road cleaning machines that are designed to brush the dirt off the road, generally towards, or into a hopper. In many road sweeping machines, a suction pipe (or hose) along with a ground following suction nozzle is provided for sucking swept dirt from the road, and to act as a conduit for passing that sucked up dirt into the hopper. A road cleaning machine can, however, just comprise a suction pipe and the hopper, i.e. no sweeping mechanism.

A cab is provided for the operator at the front of the vehicle so as to give a good view of the area to be swept. An internal combustion engine provides motor power and also power to drive the brushes, suction fan and other devices.

Because the machine is designed to be used on footpaths and other narrow areas, it is important to provide a compact machine.

Internal combustion engines emit greenhouse gases which are harmful to the atmosphere. A more ecologically friendly power source is electricity from batteries. However, batteries are heavy and bulky.

There is therefore a need to provide a battery powered road cleaning machine which is compact.

Thus, according to the present invention there is provided a cleaning machine having two front wheels and two rear wheels supporting a chassis, the chassis having a central spine and at least one electrical cell for propelling the cleaning machine, the at least one electrical cell being positioned between one of the front wheels and one of the rear wheels and outboard of the central spine.

Advantageously, by providing a spine type chassis, i.e. a chassis in which the front wheels are connected to the rear wheels via a single beam, which single beam is positioned centrally, provides a convenient space for electrical cells.

The invention will now be described, by way of example only, with reference to the accompanying drawings in which:—

Figure 2:
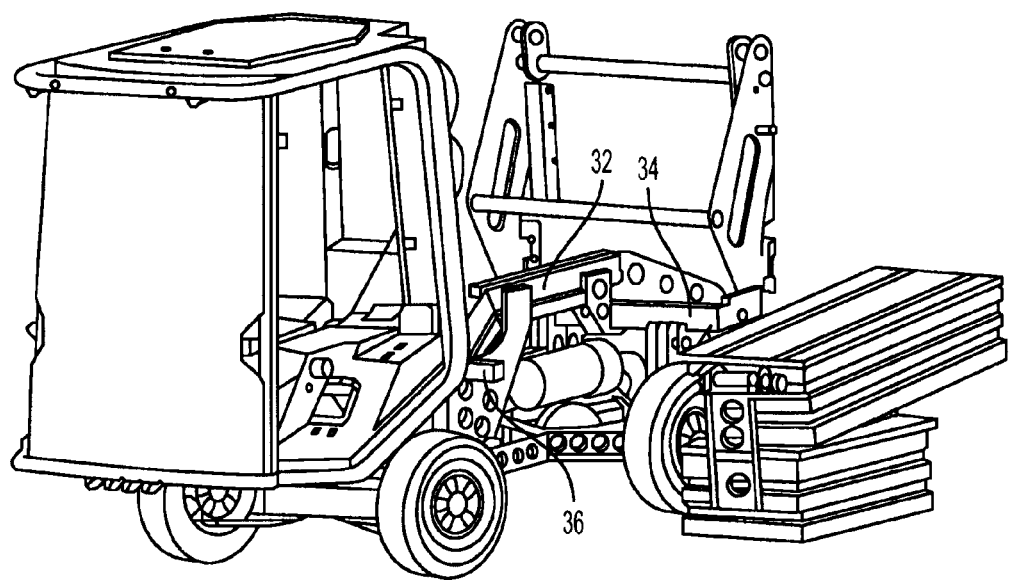
Figure 3:
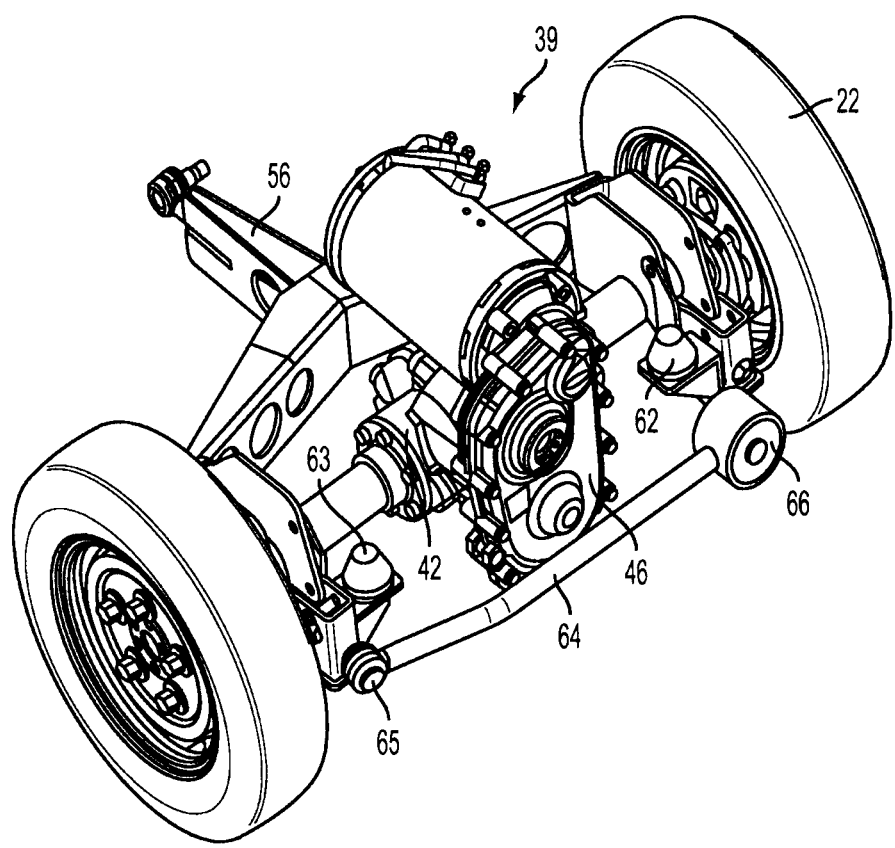
Figure 4:
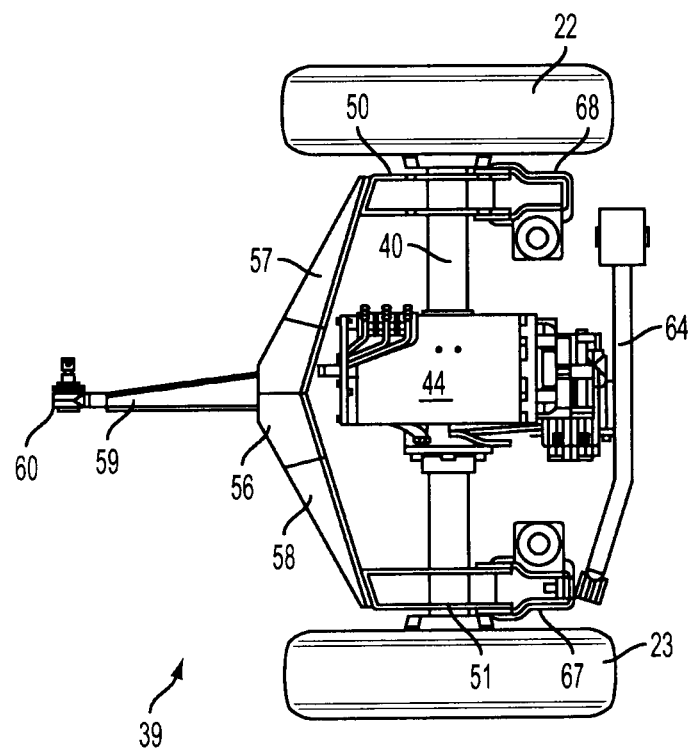
Figure 5:
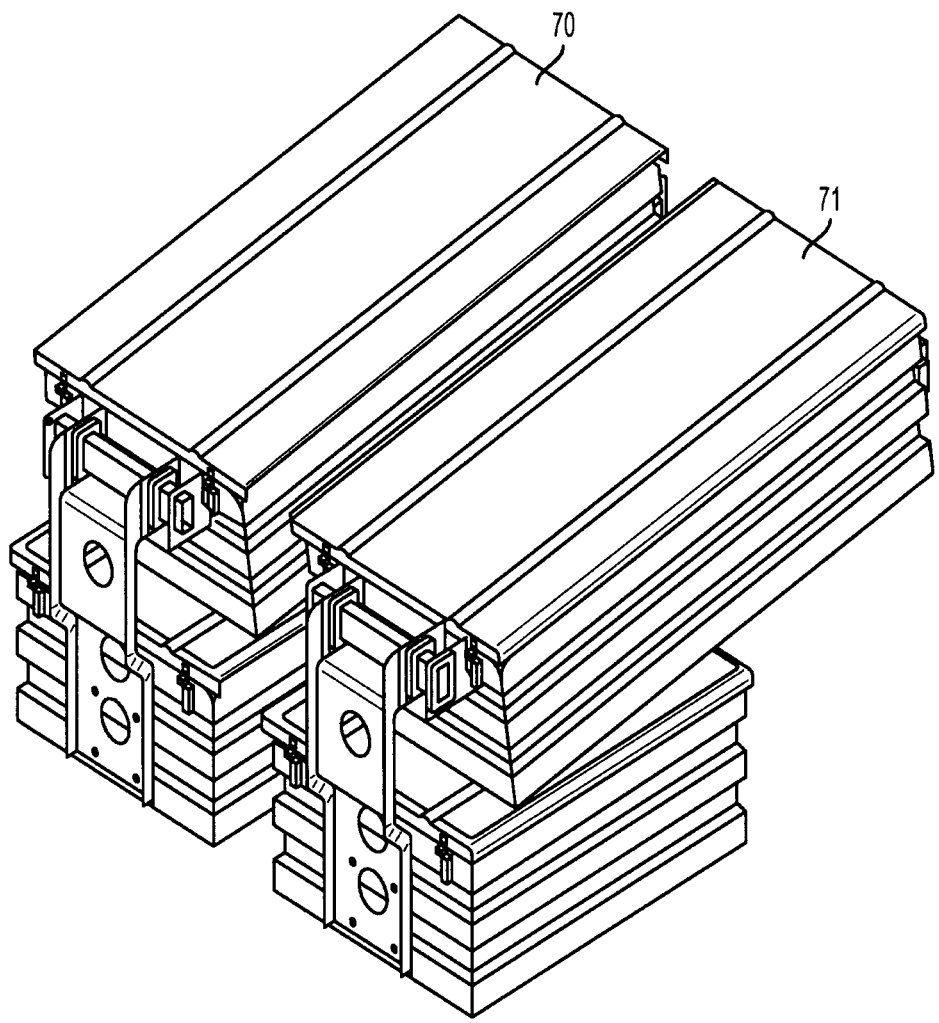
Figure 6:
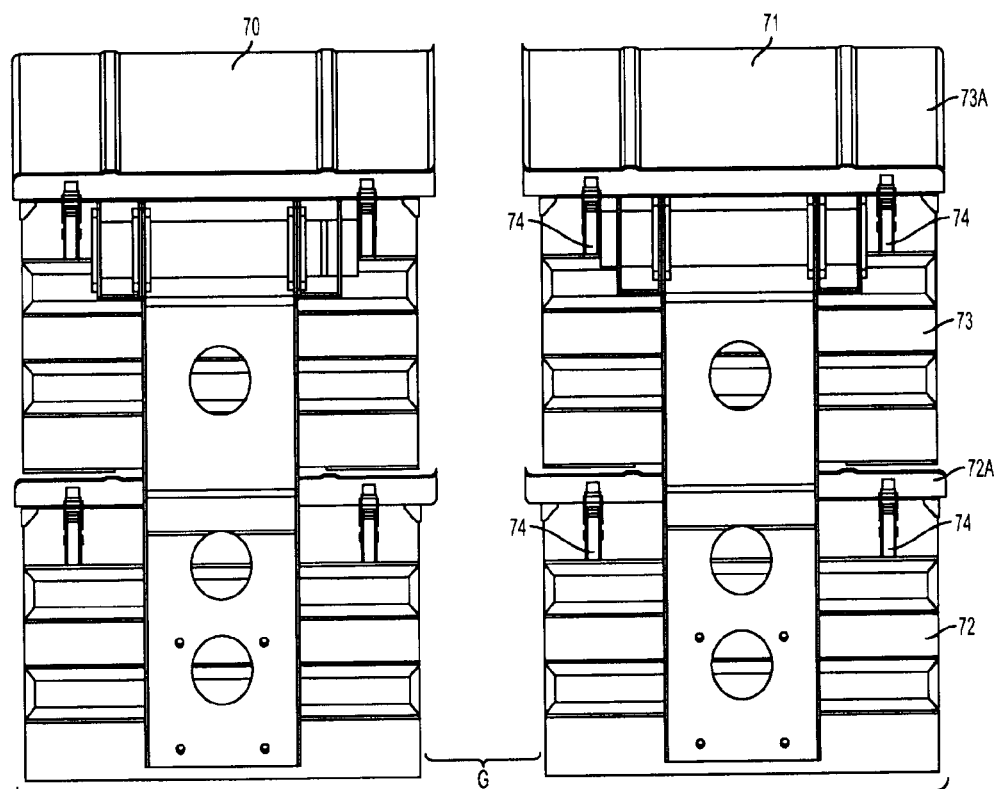
Figure 7:
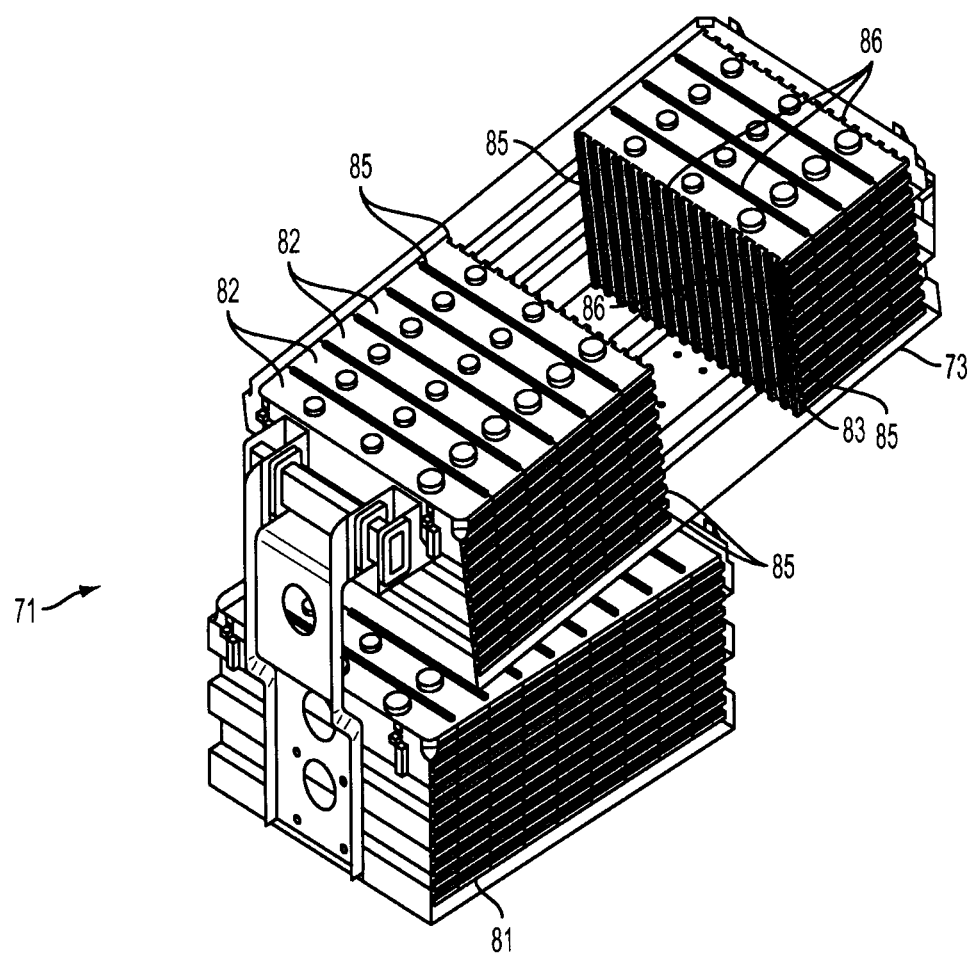
Figure 8:
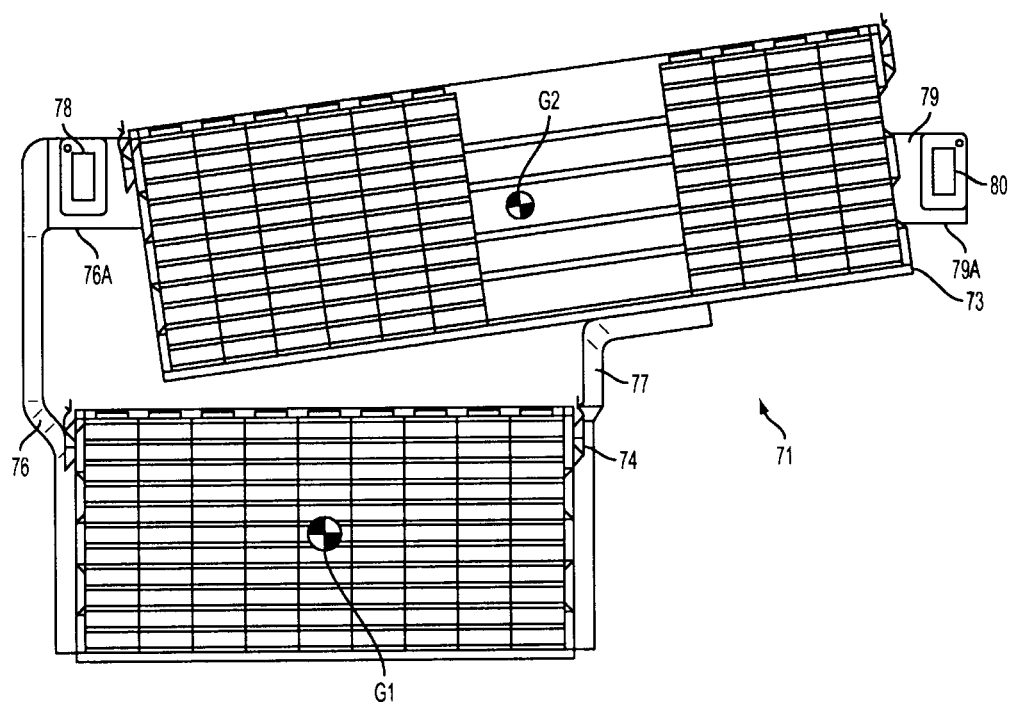
Figure 9:
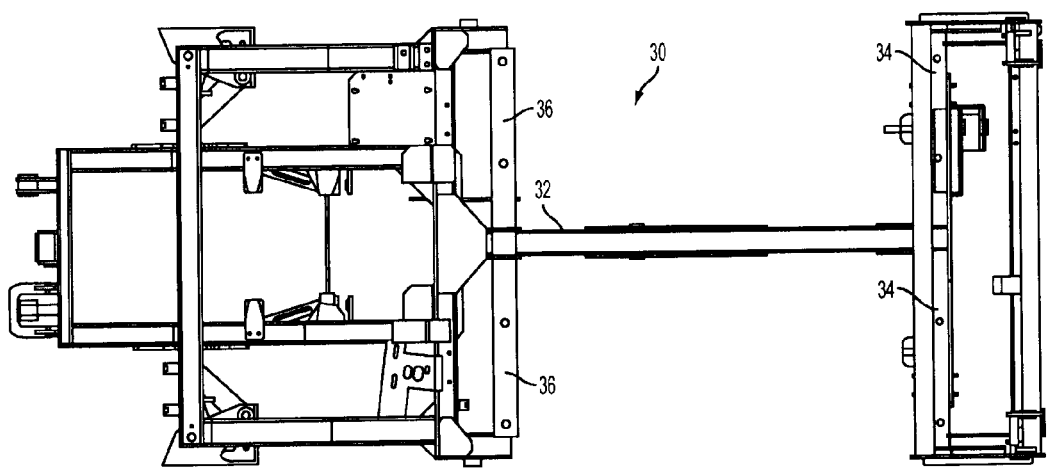
Figure 10:
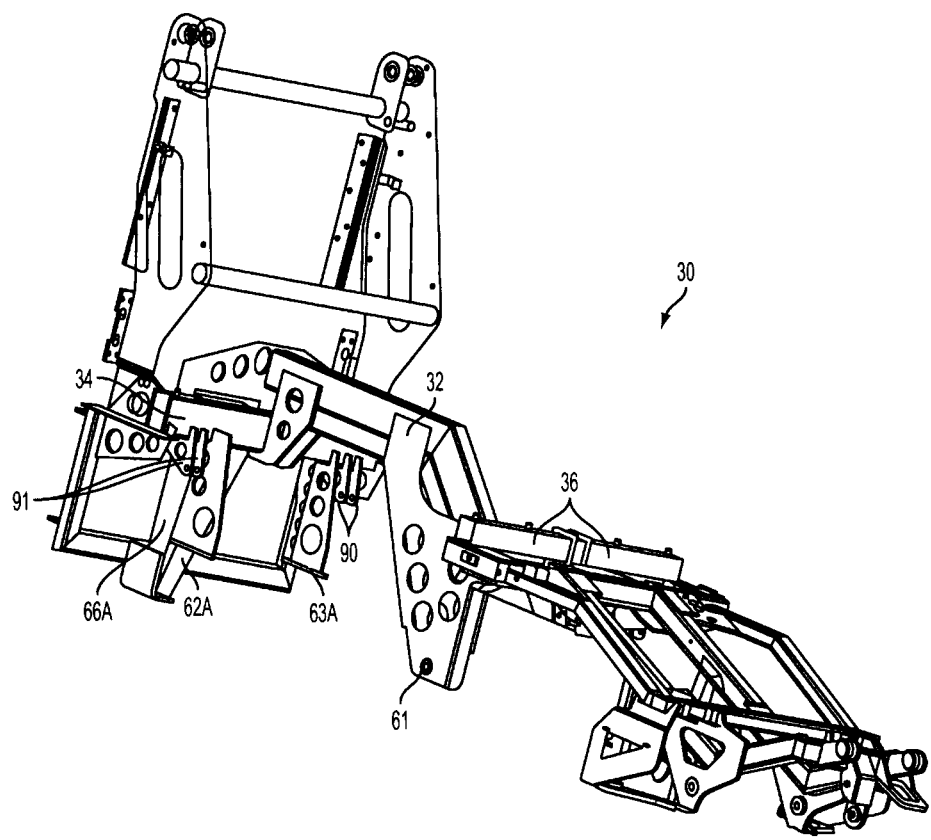
Figure 11:
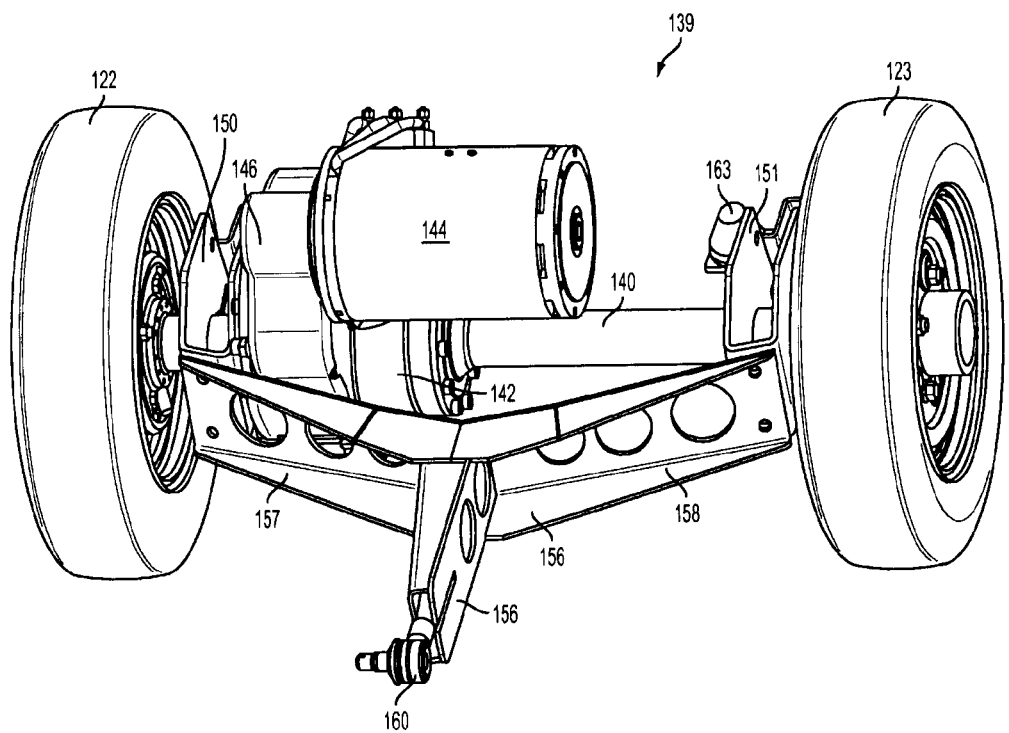
Figure 12:
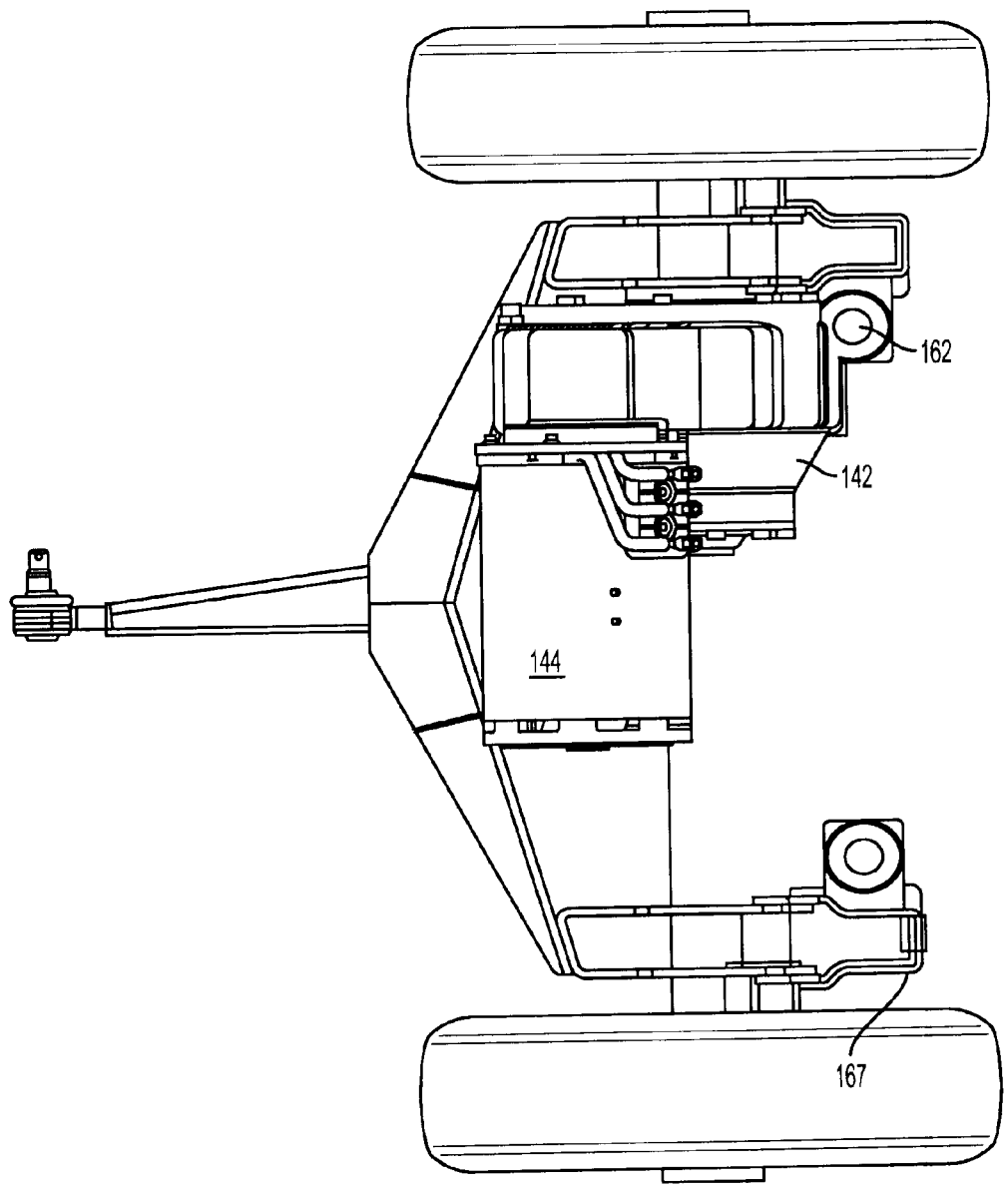
Figure 13:
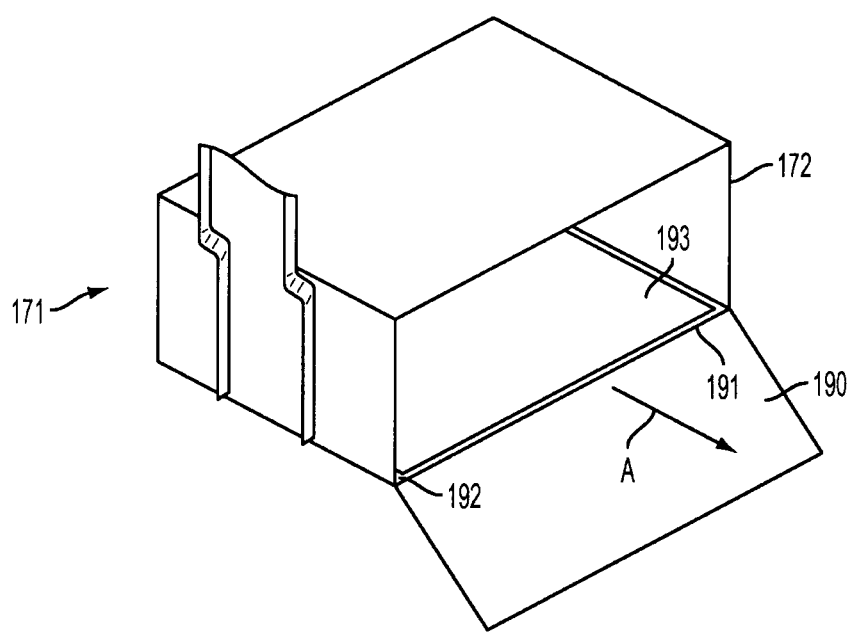

FIG. 1 is an isometric view of a cleaning machine according to the present invention, FIG. 2 is an isometric view of the cleaning machine of FIG. 1 with the hopper and the right and left battery packs removed, FIG. 3 is an isometric view of the rear axle assembly of the cleaning machine of FIG. 1, FIG. 4 is a plan view of FIG. 3, FIG. 5 is an isometric view of the right and left battery packs of the cleaning machine of FIG. 1, FIG. 6 is a front view of FIG. 5, FIG. 7 is an isometric view of the left battery pack of FIG. 5 with certain components removed, FIG. 8 is a side view of FIG. 7, FIG. 9 is a plan view of the chassis of the cleaning machine of FIG. 1 shown in isolation, FIG. 10 is an isometric view of FIG. 9, FIG. 11 is an isometric view of an alternative rear axle assembly, FIG. 12 is a plan view of FIG. 9, and FIG. 13 is an isometric view of a second embodiment of a cell box of a cleaning machine according to the present invention.

With reference to FIGS. 1 to 10 there is shown a cleaning machine, in this case a sweeping machine 10. The sweeping machine includes an enclosed cab 12, a hopper 14, a suction nozzle 16 and brushes 18. The sweeping machine includes a front right wheel 20, front left wheel 21, rear right wheel 22 and rear left wheel 23. The wheels support a chassis 30. The front wheels are steerably mounted on the chassis. The rear wheels form part of a rear axle assembly 39. The chassis has a central beam 32 (best seen on FIG. 9) at the rear of which is a laterally extending rear outrigger support 34. A front outrigger support 36 extends laterally from the central beam 32 at a position just behind the front wheels.

The out rigger supports 34 and 36 each extend laterally either side of the central beam 32 and each out rigger support is formed from a continuous beam, in this case a rectangular section tube.

As best seen in FIGS. 3 and 4 the rear wheels are mounted on a beam axle 40 having a centrally positioned differential unit enclosed within a differential housing 42. An electric motor 44 is positioned above the beam axle 40. The output shaft of the electric motor rotates about a longitudinal axis of the machine and drives a series of reduction gears housed within housing 46. The final reduction gear drives a pinion, which in turn drives a crown wheel connected to the differential unit. Right and left drive shafts connect the differential unit to the right and left rear wheels respectively.

As will be appreciated, the electric motor 44 and transmission reducing gears are all mounted on the beam axle, i.e. they all constitute "unsprung" mass, when considering the suspension of the vehicle.

The right-hand end of the beam axle is connected to a U-shaped bracket 50 (see especially FIG. 4). The left-hand end of the beam axle is connected to a similar U-shaped bracket 51.

A frame 56 includes a right arm 57 and a left arm 58. The right-hand end of right arm 57 is connected to a front portion of U-shaped bracket 50 and the left end of left arm 58 is connected to a front portion of U-shaped bracket 51. The left end of right arm 57 and the right end of left arm 58 are connected together at a centre line of the machine.

The rear axle assembly also includes a trailing arm 59, connected at its rear end to the mid point of the frame 56. The trailing arm projects forwards from the frame 56 and includes a ball joint 60.

The ball joint 60 is connected to the chassis 30 at hole 61 and as such the rear axle assembly 39 is pivotally mounted to the chassis 30. A right side "coil over damper" is connected at an upper end to plates 90 mounted on the right-hand end of the rear outrigger support and at a lower end to the bracket 50. A left side "coil over damper" is connected at an upper end to plates 91 mounted on the left-hand end of the rear outrigger support and at a lower end to bracket 51. A bracket 68 is attached to the rear of bracket 50, and a bracket 67 is attached to the rear of bracket 51. Right side bump stop 62 is mounted on bracket 68 and left side bump stop 63 is mounted on bracket 67. The bump stops engage corresponding abutments 62A and 63A on the chassis 30. The bump stops in conjunction with the coil over dampers control the roll of the chassis relative to the rear axle assembly 39.

A pannard rod 64 includes a ball joint 65 at a left-hand end which is connected to bracket 67. The right hand end of the pannard rod includes an elastomeric bush 66 which in turn is connected to a downwardly extending arm 66A of the chassis 30.

Consideration of FIG. 4 shows that the trailing arm 59 meets the frame 56 at a position which is generally in line with the front of the rear wheels 22 and 23. The right and left arms of frame 56 extend rearwardly and laterally to the front edge of the U-shaped brackets 50 and 51. Thus, the frame 56 in conjunction with the U-shaped brackets 50 and 51 provide a connection point for the rear end of the trailing arm which is generally in line with the front edge of the rear wheels. Such an arrangement minimises the length of the trailing arm 59 whilst ensuring space is provided for the battery packs (as will be described below).

The trailing arm 59 is positioned below the central beam 32 of the chassis 30.

It will be appreciated that the ball joint 60 and trailing arm 59 control forward and rearward movement of the rear axle assembly relative to the chassis, and take the reaction forces from the drive and braking torque. The pannard rod 64 controls lateral movement of the rear axle assembly relative to the chassis. The coil over dampers and bump stops control vertical movement and roll of the rear axle assembly relative to the chassis. The arrangement of the rear axle assembly and chassis 30 is such that space is provided between the front and rear wheels and outboard of the central beam 32 and outboard of the trailing arm 59 for battery packs 70 and 71. This space is best seen in FIG. 9.

As shown in FIG. 5 the right side battery pack 70 and the left side battery pack 71 are shown in the same relative position as they would be when mounted on the sweeping machine 10. As best seen in FIG. 6 there is a narrow gap G within which sits both the central beam 32 and the trailing arm 59.

Looking at left side battery pack 71 in more detail, there is provided a first cell box 72 and a second cell box 73, each cell box is generally rectangular in plan, side elevation and end elevation and includes a lid 72A and 73A respectively. Each lid is secured by clips 74. As best seen in FIG. 8, the first cell box 72 is mounted horizontally, whereas the second cell box 73 is mounted at a non zero angle relative to the first cell box. In this case the second cell box is mounted at 10° and slopes upwardly towards the rear. Brackets 76 and 77 connect the first cell box to the second cell box. Bracket 76 includes a forklift tine slot 78. At the rear of the second cell box is a further bracket 79 with a further forklift tine slot 80. It will be appreciated that in order for the tine slot 78 and 80 to be positioned horizontally relative to each other, because the second cell box slopes the forklift tine slot 78 is connected near an upper edge of the front of the second cell box whereas the forklift tine slot 80 is connected near a lower edge of the rear of the second cell box.

When the battery pack 71 is mounted on the cleaning machine a lower surface 76A of bracket 76 rests on the top left hand side of the front out rigger support and a lower surface 79A of bracket 79 rests on the top left hand side of the rear out rigger support. Suitable securing pins (not shown) hold the battery pack to the out riggers.

FIGS. 7 and 8 show the first and second cell boxes with their lids and a side panel removed. The second cell box 73 contains a total of 14 electric cells 81 (also referred to herein as second cells) (four of which have been removed to show further detail). In this case, each cell is a 400 amp hour cell. Each cell is 450 mm wide by 71 mm thick by 288 mm tall. In further embodiments different types of cells could be used. Inside the first cell box 72 is an array of nine electric cells 81 (also referred to herein as first cells), in this case identical to second cells 82. The orientation of the first and second cell boxes, in conjunction with the spine chassis of the machine provide for a compact arrangement.

As will be appreciated, the nine first electric cells 81 in the left side first cell box 72 are positioned between the front and rear left-hand wheels and outboard of the chassis 30. The first cells 81 are all orientated similarly relative to the machine, thus all first cells 81 are orientated vertically i.e. edges 85 where the front and back face of a cell meet the sides of the cell are all vertical. Each cell 81 is also orientated laterally relative to the machine i.e. edges 86 where the front and back faces of a cell meet the top and bottom of the cell are all orientated laterally relative to the machine. However, the fourteen second cells 82, whilst being orientated parallel to each other, are orientated differently relative to the machine than the first cells 81. Thus, the second cells 82 are not vertically orientated, rather they are angled relative to the vertical, in this case at 10° relative to the vertical. However, the second cells 82 are orientated laterally relative to the vehicle (see edges 86 of second cells).

Because the second cell box 72 slopes upwardly towards the rear of the vehicle, the second cells similarly slope upwardly towards the rear of the vehicle.

As will be appreciated, some of the second cells (the front eight second cells 82) are mounted above the first cells 81. However, some of the second cells 82 (the rearmost four cells 82) are mounted above the rear wheel.

It will be appreciated that the second cell box 73 contains more cells than the first cell box.

As mentioned above, forklift tine slots 78 and 80 are provided. This allows a forklift to approach the vehicle from the side so that a forklift tine is inserted into each of the slots 78 and 80. Once this is done the weight of the battery pack can be taken by the forklift and the securing pins which hold the battery pack to the vehicle can be removed. Once the battery pack has been electrically disconnected, it can be removed from the vehicle and replaced with another battery pack. This is particularly useful when the vehicle is to be used on consecutive shifts so as to allow a spent battery pack to be removed and replaced with a fully charged battery pack. Significantly, because the first cell box 72 is mounted horizontally in the vehicle, when it is removed from the vehicle by a forklift, it can be placed on the ground and the forklift tines can be removed from the forklift tine slot 78 and 80. Once thus positioned, it can be electrically connected to a recharging system in order to recharge the cells.

As best seen in FIG. 8, G1 is the centre of gravity of the first cell box 72 and G2 is the centre of gravity of the second cell box 73. As will be appreciated, the centre of gravity G2 of the second cell box has been offset relative to the centre of gravity of the first cell box, in this case offset to the rear. Nevertheless, the centre of gravity of the battery pack 71 is still positioned between the front and rear faces of the first cell box 72. Thus, in spite of the centre of gravity as being offset, the battery pack 71 will nevertheless stand on the bottom surface of first cell box 72 without toppling over. As will be appreciated from FIG. 8, the front face of the second cell box 73 is offset relative to the front face of the first cell box 72, in this case offset towards the rear. This allows for the surface 76A of the bracket 76 to be positioned above the front of the first cell box, and consequently allows the front out rigger support 36 to be positioned above the front of the first cell box. By offsetting the front faces of the first and second cell boxes allows the front of the first cell box to be positioned below the front out rigger support 36. This provides for a particularly compact arrangement since it is utilising space (that space beneath the front out rigger support) that would otherwise not be used.

It will also be appreciated from FIG. 8 that the rear face of the second cell box is offset from the rear face of the first cell box, in this case offset towards the rear. This also provides for a compact arrangement since it allows the rear cells in the second battery box to be positioned above the rear wheel.

As mentioned above, the battery packs can be removed by utilising fork lift tine slots 78 and 80 to lift the battery pack. Alternatively, because the bottom of the first cell box is relatively close to the ground, a lifting device, such as a pallet truck can be inserted underneath the battery pack and then operated so as to lift the battery pack from the front and rear out rigger supports. The pallet truck (or similar) can then be maneuvered to remove the battery packs from the cleaning machine. The battery pack can then be positioned in a cradle (or stand) adjacent an electrical power source in order for the batteries to be recharged. This then frees up the pallet truck or the like to be used to remove the second battery pack.

As mentioned above, the first cell box 72 has a base and four fixed sides with a removable lid. FIG. 13 shows an alternative first cell box 172 of the battery pack 171. The battery pack 171 is a left hand battery pack and the left hand side 191 of the cell box 172 is openable. In this case the left hand side 190 pivots about a hinge 191 attached to the base 192 of the first cell box 172. The first cell box 172 includes a tray 193 upon which the electric cells (not shown) are mounted. The tray can be slid outwards in the direction of arrow A to allow access to the cell terminals (positioned at the top of each cell), and in particular to exchange a damaged cell with a new cell. Suitable slack is provided in the battery leads connected to the cells to allow the cells to be slid outwardly without having to disconnect any particular cells. Once cell maintenance has been completed, including replacing the cells if required, the tray can be slid back into the box together with the cells and the left hand side 190 can then be hinged upwardly to close. The battery pack 171 includes a second cell box similar to cell box 73. A similar battery pack is provided on the right hand side of the machine with a lower cell box that has an openable right hand side.

With reference to FIGS. 11 and 12, there is shown a second embodiment of a rear axle assembly 139 in which components that fulfil the same function as those of rear axle assembly 39 are labelled 100 greater. In this case, the motor 144 has a motor shaft which rotates about an axis parallel to the rear beam axle 140, i.e. perpendicular to a longitudinal axis of the machine. The housing 146 contains reduction gears which drive a differential unit positioned in the differential housing 142. However, it will be appreciated that in this case a crown wheel and pinion is not required since the motor shaft, reduction gears and differential are all rotating about axes which are parallel to each other. Note that in this case, whilst the motor is generally centrally located between the wheels, the reduction gears are offset towards the right hand side of the vehicle and consequently the differential unit is offset towards the right hand side of the vehicle.

In an alternative arrangement, a "Watt's linkage" could be used in place of the Pannard rod. Watt's linkages are well known for use on vehicle suspensions to control the lateral movement of the rear axle. They consist of two horizontal rods of equal length, the outboard ends of which are pivotally mounted to the chassis. The inboard end of each rod is pivotally mounted at opposite ends of a relatively short vertical bar. The centre of this bar is pivotally connected to the rear axle.

The invention claimed is:

1. A cleaning machine having two front wheels and two rear wheels supporting a chassis, the chassis having a central spine, the cleaning machine including a first electrical cell for propelling the cleaning machine, said first electrical cell being positioned between one of the front wheels and one of the rear wheels and outboard of the central spine in which the rear wheels are connected by a beam axle and the beam axle being connected to the central spine, the connection of the beam axle to the central spine including a single, elongate trailing arm pivotally connected, at a forward part thereof, to the central spine at a pivot connection, said first electrical cell being positioned on a right hand side of the cleaning machine, the cleaning machine including a second electrical cell for propelling the cleaning machine, said second electrical cell being positioned between one of the front wheels and one of the rear wheels and outboard of the central spine on a left hand side of the cleaning machine, the first electrical cell and the second electrical cell defining a gap therebetween within which is positioned a part of the central spine, the forward part of the single trailing arm, and the pivot connection.

2. The cleaning machine of claim 1, wherein the single trailing arm is pivotally connected to the central spine by a ball joint.

3. The cleaning machine of claim 1, wherein a rear part of the trailing arm is connected to a central part of a transversely mounted frame with the right side end of the transversely mounted frame connected to a right side end of the beam axle and a left side end of the transversely mounted frame connected to a left side end of the beam axle.

4. The cleaning machine of claim 3, wherein said rear part of the trailing arm is generally in line with the front of the rear wheels.

5. The cleaning machine of claim 1, wherein said single trailing arm is positioned below the central spine.

6. The cleaning machine of claim 1, further comprising a Panhard rod connected at one end to the beam axle and connected at another end to the chassis.

7. The cleaning machine of claim 1, further comprising a Watt's linkage having two generally horizontally disposed rods each being connected to the chassis at an outboard end, the two rods each being connected to a generally vertically orientated bar at an inboard end, the generally vertically orientated bar being connected to the beam axle.

8. The cleaning machine of claim 1, wherein the forward part of the trailing arm is narrower than the gap defined by first electrical cell and the second electrical cell.

9. A cleaning machine having two front wheels and two rear wheels supporting a chassis, the chassis having a central spine, the cleaning machine including a first electrical cell for propelling the cleaning machine, said first electrical cell being positioned between one of the front wheels and one of the rear wheels and outboard of the central spine, the cleaning machine including a second electrical cell for propelling the cleaning machine, the first electrical cell being orientated horizontally, the second cell sloping upwardly towards the rear of the cleaning machine.

10. The cleaning machine of claim 9, wherein the second electrical cell is mounted above the first electrical cell.

11. The cleaning machine of claim 9, wherein the first electrical cell and the second electrical cell are mounted in a frame, the frame being selectively mountable on and demountable from the cleaning machine in order to change the electrical cells.

12. The cleaning machine of claim 11, wherein the frame includes a first cell box for receiving one or more first electrical cells and a second cell box for receiving one or more second electrical cells.

13. The cleaning machine of claim 12, wherein the first cell box is orientated horizontally.

14. The cleaning machine of claim 12, wherein the first cell box includes a removable side.

15. The cleaning machine of claim 14, wherein the first cell box includes a tray for receiving one or more electrical cells, the tray being configured to slide out of the cell box and to slide into the cell box.

16. The cleaning machine of claim 12, wherein the second cell box is orientated so as to slope upwardly towards the rear of the machine.

17. The cleaning machine of claim 12, wherein the second cell box is capable of receiving more electrical cells than the first cell box.

18. The cleaning machine of claim 12, wherein the second cell box includes a front mounting bracket and a rear mounting bracket to mount the frame on the chassis.

19. The cleaning machine of claim 18, wherein the front mounting bracket is proximate the top of the second cell box and the rear mounting bracket is proximate the bottom of the second cell box.

* * * * *